Jan. 13, 1931.   R. J. POMEROY   1,788,740
METHOD OF MAKING COMPOSITE PICTURES
Filed Feb. 7, 1927
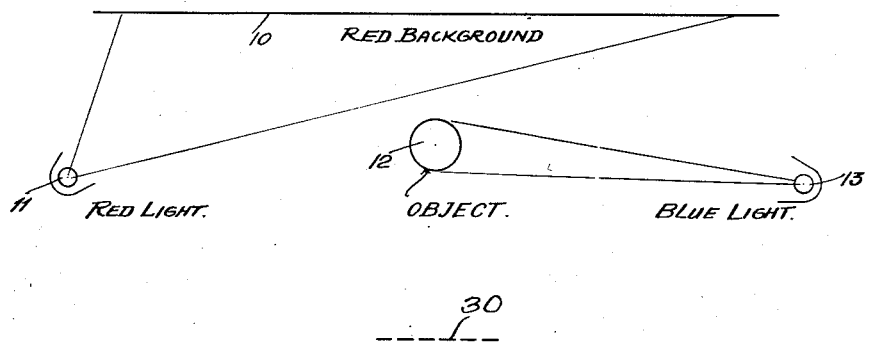
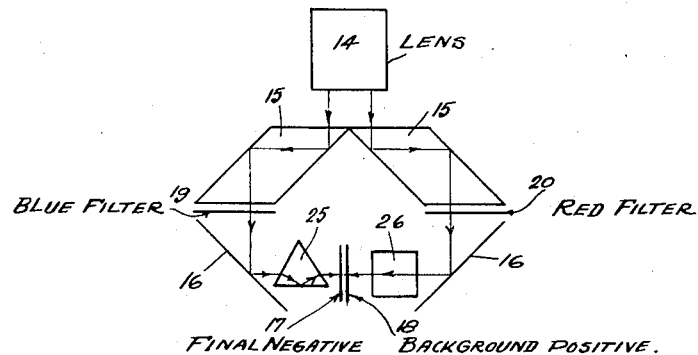
Inventor
Roy J. Pomeroy
Attorney.

Patented Jan. 13, 1931

1,788,740

UNITED STATES PATENT OFFICE

ROY J. POMEROY, OF LOS ANGELES, CALIFORNIA, ASSIGNOR OF ONE-HALF TO PARAMOUNT PUBLIX CORPORATION, OF LOS ANGELES, CALIFORNIA, A CORPORATION OF NEW YORK

METHOD OF MAKING COMPOSITE PICTURES

Application filed February 7, 1927. Serial No. 166,301.

This invention has to do with the art of producing composite pictures by photography and has particularly to do with a method somewhat similar to the method set out in my application entitled Methods of producing composite photographs, Serial No. 76,423, filed December 19, 1925.

In said prior application I describe a method that utilizes a transparent colored positive of one component of the picture, say the background; and then, by the use of illuminations of distinctive colors to illuminate the background transparency and the other picture component, respectively, I am enabled to expose a final negative simultaneously to both the background component and to the other component, with the final result that said other component appears to have been photographed in said background.

The operation of the method, as explained in said application, is dependent upon the use of two illumination colors that are preferably substantially complementary. Among other objects of the present invention, it may be taken as a major object to provide a method whereby the scheme of complementary or distinctive illumination colors (colors that may be described as having a minus relation to each other), may be utilized for the production of composite pictures without the necessity of preparing a special photographic transparency in one of said colors, and thus, whereby an ordinary black and white photograph may be utilized in the place of such a color transparency.

The present invention will be best understood from the following detailed explanation of a preferred and illustrative embodiment reference for that purpose being had to the accompanying drawings, in which—

The single figure is a diagram illustrating optical arrangements suitable for the method.

It will be understood that the particular colors herein referred to are not any necessary limitation upon the invention that any two colors may be used, each of which has a substantially minus relation to the other. For instance, I will choose the color of one illumination to be red and thus provide a red background 10, which may be further illuminated by a red light 11 of the same color, care being taken that the red light does not fall upon the object 12 which is illuminated by blue light 13. As the only function of the illuminated background is to provide a light of that selected color to illuminate the background positive (in all parts except that blocked out by the object) it will be seen that either a red background or any other source of such colored light, may be placed as far behind the object as may be desired. The object may be illuminated as desired by light of the other selected color. The optical arrangement for taking the final composite picture may be varied to suit circumstances, but as an illustration I show a lens at 14 having behind it a light-splitting arrangement comprised of two reflecting prisms 15 from which the two split beams are reflected onto two reflectors 16 whence they are reflected in register and in opposite directions upon the opposite faces of the final negative 17. The function of this optical system is to throw two identic images of the object 12 onto the final negative 17. For simplicity and effectiveness of arrangement and operation I prefer to throw these images in opposite directions onto the final negative; although any arrangement will suffice that will allow the selective color filtering of the two beams.

An ordinary black and white background positive (what is known as an ordinary black and white positive transparency or diapositive) is placed at 18 in contact with the final negative, both the final negative and the background positive being thus in or substantially in, a focal plane. It will be understood from what follows that the background positive does not need to be in contact with the final negative; it only needs to be in a focal plane somewhere in the optical system and in such a position that its image is thrown upon the final negative.

One of the split beams of light, the one on the left in the drawing, reaches the final negative without passing through the background positive; and, in the color selections herein made, this beam passes at some point in its path through a blue filter 19— a filter of the same minus-red color hereinbefore referred to. The other split beam, on the right in the drawings, passes at some point in its path through a red filter 20— of the same minus blue color hereinbefore referred to.

It will be understood that the method which I am here explaining is applicable to all sorts of compositions and is not necessarily restricted to the composition of what may strictly be termed an object with a background. The object and background herein spoken of are merely illustrative of two components desired to be assembled in a single photograph. And neither is it broadly necessary for the purpose of this method that the object referred to be an actual object, in the ordinary sense of the word. It might, for instance, be a painting or photograph, or other delineation, or image, and thus it might be a small photographic positive or negative, as hereinafter explained. All such possibilities come broadly within the present invention, although more specifically, the making of a composite picture from two previously exposed films or photographs representing the two desired components, is more particularly the specific subject matter of a companion application filed on even date herewith entitled "Method of making composite pictures", Serial No. 166,302.

With the foregoing understandings the present method will now be explained specifically and illustratively with regard to the composition of an object and a background. Composition pictures, such as here concerned, are particularly useful in motion pictures, and it may therefore be supposed that the object 12 is one concerning motion. And, as will be readily understood, the previously taken background positive may also be one that concerns motion and thus the background positive as well as the final negative 17 may be in the nature of motion picture film.

Using the illumination colors hereinbefore set out, it will be seen that lens 14, which is focused upon the object 12 to throw an image thereof onto the focal plane represented by final negative 17 and background positive 18, will take a view comprising the object surrounded by an illuminated ground. The object will be illuminated exclusively by blue light and the ground illuminated exclusively by red light. By the light splitting arrangement, two separate and identic beams will be projected from the lens; but the beam that is to fall directly upon the final negative 17 passes through the blue filter 19 and consequently has all of its red light absorbed. Consequently, the only image thrown upon the final negative in blue light will be the image of object 12.

The other light beam encounters the red filter 20; and is thus robbed entirely of all its blue light. Thus, all the light that would otherwise finally form an image of object 12 is taken out of this red-filtered beam and the image finally formed on negative 17 from the right-hand side is merely an image in red light of the red illumination source (the uniform background) with the exception that there is a dark "hole" in this so-called image representing accurately a true silhouette of object 12. This silhouette (the area where there is a total absence of light) registers exactly with the object image thrown upon the negative from the opposite side, due to the symmetrical arrangement of the optical system. Thus, the background positive 18 is illuminated only in those parts that do not correspond in position to the object image, and the background positive is light exposed upon or printed upon the final negative in only those parts. The result on the final negative is the clear and accurate insertion of an image of object 12 into the selected background.

In order to make the "hole" and the image register with each other in correct aspect, a reversing prism is inserted at 25 and a corresponding plain block of glass 26 is inserted at the other side to equalize the lengths of the paths through glass; the drawing showing the final negative and the background positive somewhat offset from the central axis of lens 14 and the physical axis of the optical system in order to make the total paths at the opposite sides equal.

It will be seen that there is in this method no possibility of lack of registration between what may be termed the "hole" in the background and the image of the object, provided the optical system is properly constructed and adjusted. There are no difficulties, such as unequal film shrinkages, to be dealt with at all.

I have said a pictorial representation may be substituted for the actual object 12. How a still photograph or painting or other representation may be the "object," will be readily understood. But a motion picture or other film may be substituted for the object as I will now explain. Suppose an ordinary motion picture film of the object—the "action"—be taken before a non-actinic ground so as to obtain a negative with a clear or transparent ground. This negative, or a reproduction of it, can then be bleached with ferricyanide and then blue-toned with suitable chemicals, as with iron chloride. The negative image is then substantially uniformly opaque to red light and is reflective of blue light as a positive. The surrounding clear ground will not reflect blue light to any extent but will pass red light. It may then be placed as at 30 before the lens, and, being moved step by step with the movements of the final negative 17, the final result on the negative is the same as before.

It will be understood that the relative densities of printings of the two component parts on final negative 17 may be varied and controlled by regulating the relative intensities of the two colored light beams; as by regulating the densities of the filters or by relatively varying the proportionate amounts of light received by the two prisms 15 from the lens. This last may be done by relatively shifting the prism system and lens so that the optical axis of the lens may be to one side or the other of the optical axis of the prism system.

I claim:

1. The method of producing a composite photograph embodying two component images, that includes illuminating one component with light of a selected color before a ground illuminated with light of a color having a minus relation to the selected color, illuminating the other component selectively with light from the ground, and exposing different parts of a fresh actinic film selectively to the illuminated second mentioned component and to the illuminated first mentioned component in lights of their respective colors.

2. The method of producing a composite photograph embodying two component images, that includes illuminating one component with light of a selected color before a ground illuminated with light of a color having a minus relation to the selected color, forming two images of the component and ground, one in light of one color and the other in light of the other color, illuminating the other component with the image that is in the color of the ground, and exposing a fresh actinic surface to the last mentioned component so illuminated and also to the image of the first mentioned component that is in the light of its color.

3. The method of producing a composite photograph embodying two component images, that includes illuminating one component with light of a selected color before a ground illuminated with light of a color having a minus relation to the selected color, superposing a fresh actinic surface and a transparent image of the other component, forming two images of the first mentioned component and ground, one exclusively in light of the selected color and the other exclusively in light of the other said color, casting the image in the first mentioned color directly onto the fresh actinic surface, and casting the image in the last mentioned color through the transparency onto the fresh actinic surface.

4. The method of producing a composite photograph embodying two component images, that includes placing a transparent image of one component at one side of a fresh actinic surface, casting a normal image of the other component onto the other side of the actinic surface, and simultaneously casting a silhouette image of the last mentioned component onto the first mentioned side of the actinic surface through the transparent component and in register with the first mentioned normal image of said component.

5. The method of producing a composite photograph embodying two component images, that includes placing a transparent image of one component at one side of a fresh actinic surface, illuminating the other component with light of a selected color, illuminating a ground behind the second mentioned component with light of a color having a minus relation to the selected color, casting an image of the second mentioned component and the ground in light of the first mentioned color onto the actinic surface from the side opposite the transparent component, and simultaneously casting another image of the second mentioned component and the ground in light of the second mentioned color onto the actinic surface through the transparent component and in register with the first mentioned image.

In witness that I claim the foregoing I have hereunto subscribed my name this 22nd day of January, 1927.

ROY J. POMEROY.